United States Patent
Yano et al.

(10) Patent No.: US 8,912,106 B2
(45) Date of Patent: Dec. 16, 2014

(54) GLASS-CERAMIC COMPOSITE MATERIAL

(71) Applicant: NGK Insulators, Ltd., Nagoya (JP)

(72) Inventors: Shinsuke Yano, Nagoya (JP); Tsutomu Nanataki, Toyoake (JP); Takami Hirai, Toyota (JP)

(73) Assignee: NGK Insulators, Ltd., Nagoya (JP)

(*) Notice: Subject to any disclaimer, the term of this patent is extended or adjusted under 35 U.S.C. 154(b) by 36 days.

(21) Appl. No.: 13/750,005

(22) Filed: Jan. 25, 2013

(65) Prior Publication Data

US 2013/0196842 A1 Aug. 1, 2013

Related U.S. Application Data

(60) Provisional application No. 61/651,153, filed on May 24, 2012.

(30) Foreign Application Priority Data

Jan. 26, 2012 (JP) .................................. 2012-014028

(51) Int. Cl.
  *C03C 14/00* (2006.01)
(52) U.S. Cl.
  CPC ........... *C03C 14/004* (2013.01); *C03C 2214/05* (2013.01); *C03C 2214/20* (2013.01)
  USPC ............................................ 501/32; 428/404
(58) Field of Classification Search
  CPC .............. C03C 14/004; C03C 2214/05; C04B 2235/3852
  USPC ............................................ 501/32; 428/404
  See application file for complete search history.

(56) References Cited

U.S. PATENT DOCUMENTS

| 4,923,689 A | 5/1990 | Uenishi et al. |
| 5,214,005 A | 5/1993 | Yamakawa et al. |
| 6,054,220 A * | 4/2000 | Mroz .......................... 428/403 |
| 6,630,417 B2 | 10/2003 | Kawai et al. |
| 2006/0128546 A1 | 6/2006 | Schluckwerder et al. |
| 2008/0171647 A1* | 7/2008 | Lee et al. ........................ 501/32 |

FOREIGN PATENT DOCUMENTS

| JP | 63-222043 A1 | 9/1988 |
| JP | 02-141409 A1 | 5/1990 |
| JP | 02-221162 A1 | 9/1990 |

(Continued)

OTHER PUBLICATIONS

Extended European Search Report dated Jun. 12, 2013.

*Primary Examiner* — Karl Group
(74) *Attorney, Agent, or Firm* — Burr & Brown, PLLC

(57) ABSTRACT

The present invention is directed to stably achieve a good thermal conductivity in a glass-ceramic composite material in which aluminum nitride particles are used as filler particles. The glass-ceramic composite material according to the present invention includes a glass matrix and filler particles, each of which is formed by an aluminum nitride particle having a surface layer on which an oxide film is formed, and arranged in the glass matrix. The present invention has characteristic features that the filler particle has a cornerless smooth surface, and that a percentage of the number of filler particles having a sphericity of 0.8 or greater, which is a value of a minor diameter divided by a major diameter, is higher than or equal to 70% on the condition where any fine particle of which particle diameter is smaller than 0.5 μm is excluded from the number of the filler particles.

4 Claims, 2 Drawing Sheets

(56) References Cited

FOREIGN PATENT DOCUMENTS

| | | | |
|---|---|---|---|
| JP | 03-075240 | A1 | 3/1991 |
| JP | 04031339 | * | 2/1992 |
| JP | 04-254477 | A1 | 9/1992 |
| JP | 06-016477 | A1 | 1/1994 |
| JP | 07-033415 | A1 | 2/1995 |
| JP | 09-202608 | A1 | 8/1997 |
| JP | 10-167757 | A1 | 6/1998 |
| JP | 2001-342063 | A1 | 12/2001 |
| JP | 2002-179413 | A1 | 6/2002 |
| JP | 2002-226207 | A1 | 8/2002 |
| JP | 2002-348172 | A1 | 12/2002 |
| JP | 2003-073162 | A1 | 3/2003 |
| JP | 2003-137657 | A1 | 5/2003 |
| JP | 2004-083334 | A1 | 3/2004 |
| JP | 2004083334 | * | 3/2004 |
| JP | 2005-533744 | A1 | 11/2005 |

* cited by examiner (i)

(ii)

(iii)

(i) - PRIOR ART (ii) - PRIOR ART

GLASS-CERAMIC COMPOSITE MATERIAL

BACKGROUND OF THE INVENTION

1. Field of the Invention

The present invention relates to a glass-ceramic composite material.

2. Description of Related Art

Glass-ceramic composite materials have been known, and especially those including a glass matrix and filler particles dispersedly disposed in the glass matrix are identified as suitable for Low Temperature Co-fired Ceramics (LTCC).

In particular, as the materials favorably used for substrates with internally formed wiring sections formed by metal (such as gold or copper), which is of low electric resistance, a multitude of glass-ceramic composite materials including aluminum nitride particles employed as the above-described filler particles have been suggested (refer to, for example, JP H02-221162 A, JP H04-254477 A, JP H06-16477 A, JP 2001-342063 A, JP 2002-348172 A, JP 2003-73162 A, JP 2003-137657 A, JP 2005-533744 A).

However, the glass-ceramic composite materials using the aluminum nitride particles as the filler particles as described above have been commonly found in patent documents, but have not been in practical use yet. After elaborate study, the applicant (inventors) of this application has discovered that there is great variability in a formation state (thickness) of an oxide film formed on a surface layer of the filler particle, resulting in the presence of a region where wettability to the glass matrix is low on the surface of the filler particle. This is a reason why the glass-ceramic composite materials have not been developed for the practical use.

More specifically, when the oxide films are formed on the surface layers (the surfaces) of the filler particles formed by the aluminum nitride particles, wettability to the glass matrix is generally improved, to thereby increase a thermal conductivity. In this regard, aluminum nitride particles have angulated shapes in materials of the above-described type according to a related art. Because of the angulated shape, corner portions are preferentially oxidized, while a planar portion between corner portions undergoes oxidization at a lower rate of progress and accordingly remains low in wettability to the class matrix. Thus, in such a state under the presence of great variability in formation state of the oxide films on the surfaces of the filler particles, sintering performance is deteriorated, and the thermal conductivity is also decreased.

Here, as a certain qualified approach for improving wettability to the glass matrix, it is at least conceivable that the thickness of the oxide film is wholly increased to form the sufficiently thick oxide film even on the planar portion between the corner portions. In this approach, however, a proportion of an aluminum oxide having a low thermal conductivity is increased in the filler particle, which instead results in a decreased thermal conductivity of the glass-ceramic composite material as a whole.

SUMMARY OF THE INVENTION

The present invention is made to address the problems set forth above. That is, the present invention is directed to stably achieve a good thermal conductivity in a glass-ceramic composite material in which an aluminum nitride particle is used as a filler particle.

<Constitution>

A glass-ceramic composite material of the present invention comprises a glass matrix; and filler particles, each of which is formed by an aluminum nitride particle having a surface layer on which an oxide film is formed, and arranged in the glass matrix. Note that other than a simple oxide film (a film coating obtained by treating aluminum nitride with heat in an oxidizing atmosphere such as an ambient air atmosphere), a phosphoric acid film or a $SiO_2$ film may be used as the oxide film.

A characteristic feature of the present invention is that the filler particle has a cornerless smooth surface; and a percentage of the number of filler particles having a sphericity of 0.8 or greater, which is a value of a minor diameter divided by a major diameter, is higher than or equal to 70% on the condition where any fine particle of which particle diameter is smaller than 0.5 μm is excluded from the number of the filler particles.

Preferably, an average particle diameter of the filler particles is 2 to 40 μm.

Also preferably, the aluminum nitride particle is an unsintered object.

<Action/Effect> in the glass-ceramic composite material of the present invention, the aluminum nitride particle in a substantially spherical shape with the cornerless smooth surface is used as the filler particle, to thereby achieve a uniform formation state (a thickness) of the oxide film when the oxide film is formed on the surface layer of the filler particle. In this way, sintering performance of the glass-ceramic composite is improved, so that a good thermal conductivity is achieved with stability.

Here, when the particle diameter of the aluminum nitride particle is smaller (than 2 μm, specifically), formation of the particle is facilitated in the substantially spherical shape with the cornerless smooth surface, but sintering performance of the glass-ceramic composite material and filling characteristics of the aluminum nitride particle are deteriorated. Meanwhile, when the particle diameter of the aluminum nitride particle is larger (than 40 μm, specifically), a surface roughness or a roughness of an interface with another layer becomes excessively great in a product or a substrate formed by the glass-ceramic composite material that includes the filler particles formed by the larger aluminum nitride particles which raises a problem in that the surface or the inside of the substrate is inadequate for forming a conductor (an electrode) film thereon or therein. With this in view, the filler particles are defined to be 2 to 40 μm in an average particle diameter and formed in the substantially spherical shape with the cornerless smooth surface, to thereby stably achieve the good thermal conductivity, and also make it possible to favorably form the conductor film on the surface or in the inside of the substrate.

It should be noted chat a powder of the substantially spherical aluminum nitride particle having the cornerless smooth surface may be obtained by eliminating, in a screening process or other processes, any particle having an improper shape from the particle powder, which is formed with a reduction nitriding method, a direct nitriding method, a gas phase method, etc., or obtained by treating the particle powder with flux (such as an oxide of alkaline earth metal, rare earth elements, or the like, or salts thereof) and removing the flux by washing, or obtained by optimizing a manufacturing condition in each of the above-listed methods.

Further, the use of the unsintered object for the aluminum nitride particles can provide favorable sintering performance to the glass-ceramic composite material due to the absence of a sintering aid such as an yttrium oxide (which has a high reactivity with materials constituting the glass matrix).

BRIEF DESCRIPTION OF THE DRAWINGS

A preferred embodiment of the present invention will be described in detail based on the following figures, wherein.

DETAILED DESCRIPTION OF THE INVENTION

Hereinafter, a preferred embodiment of the present invention will be explained using working examples and comparative examples. The following description of the embodiment is provided to concretely describe, to the extent possible, is merely an example embodying the present invention for the purpose of satisfying the description requirements for a specification (the written description requirement/the enabling requirement) pursuant to laws and regulations. Thus, as described below, it is naturally understood that the present invention is not limited to any specific constitution of the embodiment and the examples, which will be described below. Exemplifications of various changes (modifications), which may be applied to the embodiment (examples) are not inserted in the explanation for the embodiment, but rather described mainly at the end to prevent hindering the understanding of coherent explanation for the embodiment (examples).

<Constitution>

Figure 1:
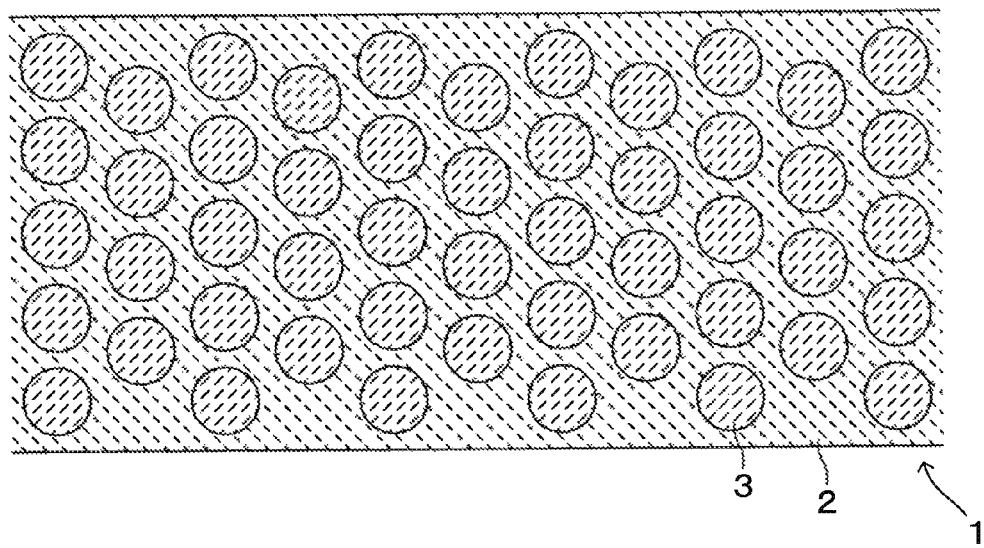
FIG. 1 schematically shows the constitution of an embodiment of a glass-ceramic composite material according to the present invention, and FIG. 2 schematically shows the constitution of a filler particle in a related art as a comparative example.
Figure 1:
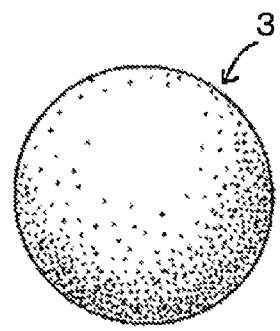
Figure 1:
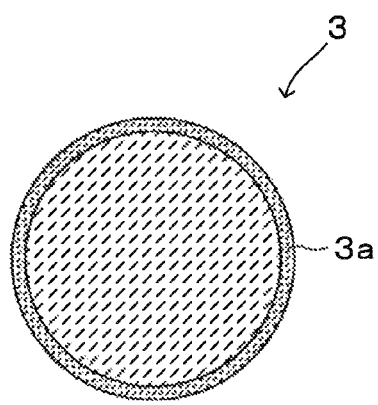

FIG. 1 schematically shows the constitution of an embodiment of a glass-ceramic composite material according to the present invention. Referring to (i) in FIG. 1, the glass-ceramic composite material 1 of this embodiment includes a glass matrix 2 and a multitude of filler particles 3. The multitude of filler particles 3 are disposed in the glass matrix 2. Further, in the glass-ceramic composite material 1, a volume ratio between the glass matrix 2 and the filler particles 3 (the glass matrix 2:the filler particles 3) is preferably 4:6 to 7:3.

As a glass component partially constituting the glass matrix 2, any known, glass component may be used, including borosilicate glass, borosilicate barium glass, borosilicate strontium glass, borosilicate zinc glass, and borosilicate potassium glass, etc., for example.

In FIG. 1, (ii) is an enlarged perspective view of the filler particle 3, and (iii) is a section view of the filler particle 3. As shown in the drawings, the filler particle 3, which is an aluminum nitride particle with a surface layer on which an oxide film 3a is applied, is formed in a substantially spherical shape with a cornerless smooth surface.

In this embodiment, a powder formed by the multitude of filler particles 3 (in a state where it is neither mixed with a glass raw material that partially constitutes the glass matrix 2 nor fired to form the glass-ceramic composite material 1) is formed in a manner that an average particle diameter of the powder is 2 to 40 μm, and a percentage of the number of particles having a sphericity of 0.8 or greater, which is a value of a minor diameter divided by a major diameter, is higher than or equal to 70% on the condition where any fine particle of which particle diameter is smaller than 0.5 μm is excluded from the number of the particles.

Further, each of the particles constituting the powder is preferably an unsintered object before the oxide film 3a is formed on the particle. Here, the "unsintered object" is an object different from a "sintered object" obtained by performing high-temperature sintering on an aluminum nit ride particle powder added with a sintering aid or a particle diameter control agent, and grinding or classifying the sintered aluminum nitride particle powder, (specifically, the object synthesized by means of a process such as a direct nitriding method, a reduction nitriding method, or a gas phase method).

<Action/Effect>

Tables 1 to 10 show evaluation results in working examples and comparative examples. In the tables, the term "glass" refers to a glass raw material partially constituting the glass matrix 2, and the term "filler" refers to a filler particle. Further, the term "particle diameter" refers to an average particle diameter [μm] measured as a number mean diameter by a laser diffraction type particle diameter distribution measuring apparatus. Still further, the term "sphere percentage" refers to a percentage of the number of particles having the sphericity of 0.8 or greater, which is a value of the minor diameter divided by the major diameter, on the condition where any fine particle of which particle diameter is smaller than 0.5 μm is excluded from the number of the particles.

It should be noted that in the working examples and the comparative examples, angulated particles are removed from a powder of aluminum nitride particles (on which no film is formed) to be used as a raw material of the filler particles. The removal may be performed while the particles are observed with an optical microscope. Alternatively, edges of the aluminum nitride powder may be removed by using a carbonate of alkaline earth metals or an oxide of rare earth elements as flux, treating the aluminum nitride powder with the flux, and acid-washing the flux after the treatment (refer to JP 2002-179413 A).

Meanwhile, the sphericity of one filler particle is calculated by taking a scanning electron microscope (SEM) photograph of a powder of filler particles placed on a flat glass substrate in a state where the particles do not overlap each other, and measuring, on the SEM photograph, the shortest length (the minor diameter) and the longest length (the major diameter) passing through the center of mass of one particle that can be identified from the SEM photograph. Further, the sphere percentage is obtained by calculating a circle equivalent diameter of each particle from an area of the particle on the photograph within one field of view of the SEM photograph, and finding a percentage of the number of particles having the sphericity of 0.8 or greater, on the condition where any particle having the circle equivalent diameter smaller than 0.5 μm is excluded from the number of the particles.

Specifically, in working examples 1a to 1c and comparative examples 1a to 1c, a glass raw material (a raw material powder of borosilicate glass consisting mainly of a borosilicate component and including an alkaline component, alkaline earth component, and an aluminous component) and filler particles are mixed at a volume ratio of 55:45, degreased at 600° C. in an ambient air atmosphere, and fired at 900 to 1050° C. in a nitrogen atmosphere subsequent to the degreasing. Further, the filler particles are obtained by treating a powder of aluminum nitride raw material particles, which satisfy the condition of predetermined particle diameter and have the predetermined sphere percentages listed in the tables, with heat at 900° C. in an oxidizing atmosphere, to thereby form an oxide layer on a surface layer (the surface) of the particle in a manner that an oxygen content lies from 1.3 to 16 percent by weight. Note that the working examples 1a to 1c (as well as the comparative examples 1a to 1c) are respectively obtained from different batches in a heat treatment step for aluminum nitride and a glass mixing step.

The working examples 1 to 10 and the comparative examples 1 to 10 show evaluation results conducted to evaluate how the thermal conductivity is affected by the sphere percentage under various conditions of the volume percentage of the filler particles, the average particle diameter of the glass raw material, and the average particle diameter of the filler particles. The evaluation results are listed below.

TABLE 1

| | Glass | | Filler | | | Thermal |
|---|---|---|---|---|---|---|
| | vol % | Particle diameter | vol % | Particle diameter | Sphere percentage | conductivity [W/m·K] |
| Working example 1a | 55 | 4 | 45 | 2 | 70 | 14 |
| Working example 1b | 55 | 4 | 45 | 2 | 70 | 13 |
| Working example 1c | 55 | 4 | 45 | 2 | 70 | 14 |
| Comparative example 1a | 55 | 4 | 45 | 2 | 60 | 8 |
| Comparative example 1b | 55 | 4 | 45 | 2 | 60 | 5 |
| Comparative example 1c | 55 | 4 | 45 | 2 | 60 | 6 |

TABLE 2

| | Glass | | Filler | | | Thermal |
|---|---|---|---|---|---|---|
| | vol % | Particle diameter | vol % | Particle diameter | Sphere percentage | conductivity [W/m·K] |
| Working example 2 | 50 | 4 | 50 | 2 | 70 | 18 |
| Comparative example 2 | 50 | 4 | 50 | 2 | 60 | 9 |

TABLE 3

| | Glass | | Filler | | | Thermal |
|---|---|---|---|---|---|---|
| | vol % | Particle diameter | vol % | Particle diameter | Sphere percentage | conductivity [W/m·K] |
| Working example 3 | 45 | 0.7 | 55 | 2 | 70 | 23 |
| Comparative example 3 | 45 | 0.7 | 55 | 2 | 60 | 11 |

TABLE 4

| | Glass | | Filler | | | Thermal |
|---|---|---|---|---|---|---|
| | vol % | Particle diameter | vol % | Particle diameter | Sphere percentage | conductivity [W/m·K] |
| Working example 4 | 40 | 0.7 | 60 | 2 | 80 | 24 |
| Comparative example 4 | 40 | 0.7 | 60 | 2 | 60 | 12 |

TABLE 5

| | Glass | | Filler | | | Thermal |
|---|---|---|---|---|---|---|
| | vol % | Particle diameter | vol % | Particle diameter | Sphere percentage | conductivity [W/m·K] |
| Working example 5 | 60 | 0.7 | 40 | 2 | 70 | 10 |
| Comparative example 5 | 60 | 0.7 | 40 | 2 | 60 | 7 |

TABLE 6

| | Glass | | Filler | | | Thermal |
|---|---|---|---|---|---|---|
| | vol % | Particle diameter | vol % | Particle diameter | Sphere percentage | conductivity [W/m·K] |
| Working example 6 | 55 | 0.7 | 45 | 5 | 70 | 16 |
| Comparative example 6 | 55 | 0.7 | 45 | 5 | 60 | 10 |

TABLE 7

| | Glass | | Filler | | | Thermal |
|---|---|---|---|---|---|---|
| | vol % | Particle diameter | vol % | Particle diameter | Sphere percentage | conductivity [W/m·K] |
| Working example 7 | 50 | 0.7 | 50 | 5 | 70 | 20 |
| Comparative example 7a | 50 | 0.7 | 50 | 5 | 60 | 12 |
| Comparative example 7b | 50 | 0.7 | 50 | 5 | 50 | 9 |

TABLE 8

| | Glass | | Filler | | | Thermal |
|---|---|---|---|---|---|---|
| | vol % | Particle diameter | vol % | Particle diameter | Sphere percentage | conductivity [W/m·K] |
| Working example 8 | 45 | 4 | 55 | 5 | 70 | 25 |
| Comparative example 8 | 45 | 4 | 55 | 5 | 60 | 13 |

TABLE 9

| | Glass | | Filler | | | Thermal |
|---|---|---|---|---|---|---|
| | vol % | Particle diameter | vol % | Particle diameter | Sphere percentage | conductivity [W/m·K] |
| Working example 9 | 40 | 4 | 60 | 10 | 70 | 26 |
| Comparative example 9 | 40 | 4 | 60 | 10 | 60 | 13 |

TABLE 10

| | Glass | | Filler | | | Thermal |
|---|---|---|---|---|---|---|
| | vol % | Particle diameter | vol % | Particle diameter | Sphere percentage | conductivity [W/m·K] |
| Working example 10 | 60 | 4 | 40 | 5 | 70 | 11 |
| Comparative example 10 | 60 | 4 | 40 | 5 | 60 | 7 |

As is evident from the above-listed results, in any of the various conditions of the volume percentage of the filler particles, the average particle diameter of the glass raw material, and the average particle diameter of the filler particles, the thermal conductivity is increased in the working examples wherein the sphere percentage is higher than or equal to 70%, as compared to the comparative examples wherein the sphere percentage is lower than 70%. Further, referring to Table 1, the variability in the thermal conductivity from batch to batch in the working examples wherein the sphere percentage is higher than or equal to 70% is smaller than those in the comparative examples wherein the sphere percentage is lower than 70%. The following reason is conceivable.

Figure 2:
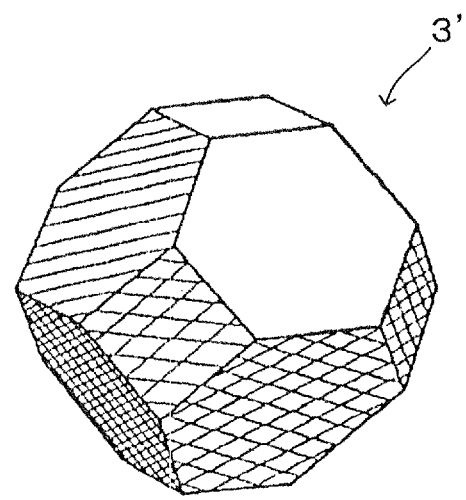
Figure 2:
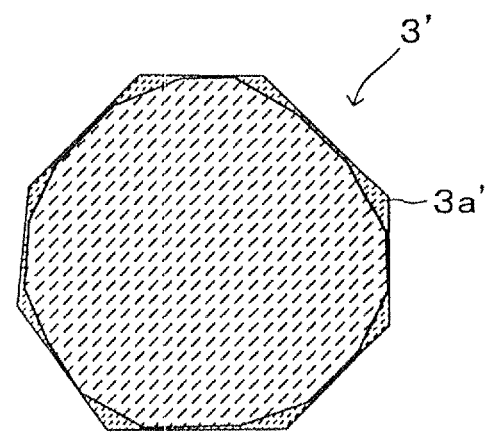

FIG. 2 is a diagram schematically showing the constitution of a filler particle 3' in a related art as a comparative example. In FIG. 2, (i) is a perspective view, and (ii) is a cross section view.

As shown in FIG. 2, when a particle has a corner (an edge line) on its surface, the oxide film 3a' is thickly formed on the corner and its surrounding region (which are collectively referred to as a "corner portion" hereinafter) while the oxide film 3a' is formed in an inferior state (in which it is thin, or in some cases, not substantially formed) on a planar portion between the corners. This is because, in a case where the above-described corner portion is present on the aluminum nitride particle before formation of the oxide film 3a', the process of oxidation is preferentially developed at the corner portion during the formation of the oxide film 3a'. Also in a case where the sphericity of the aluminum nitride particle is smaller, the preferential process of oxidation similarly occurs in a relatively "acute" portion of which radius of curvature is small.

For this reason, among the filler particles 3', any filler particle 3' having the corner (edge line) on its surface or having the smaller sphericity exhibits wide variations in the formation state of the oxide film 3a' on the surface. The presence of such variations results in poor sintering performance during the sintering process after mixing with the glass raw material, which accordingly decreases the thermal conductivity of the sintered glass-ceramic composite material.

As opposed to the above, because the aluminum nitride particle having the substantially spherical shape with the cornerless smooth surface is used as the filler particle 3 in the present embodiment, the formation state (thickness) of the oxide film 3a becomes substantially uniform during formation of the oxide film 3a on the surface layer of the filler particle 3. In this way, the sintering performance of the glass-ceramic composite material 1 is improved, to thereby achieve the good thermal conductivity with stability.

<Exemplary Listing of Modifications>

Again, the above-described embodiment and the specific examples are provided, as already noted above, to describe merely an example that embodies the present invention, and that is believed by the applicant to be the best example at the time of filing of this application. Primarily, the present invention should not be regarded as being limited to the above-described embodiment and the examples. Various modifications may be, of course, made to the above-described embodiment and the examples to the extent that they do not change the essential part of the invention.

Hereinafter, some modifications will be illustrated. In the following explanation about the modifications, components having the same constitution and/or functions as those of each component in the above-described embodiment are designated in the modifications by the same names and the same reference numerals as those of the embodiment. Further, the description in the above-described embodiment shall be also applicable as appropriate to descriptions related to those components unless any inconsistency arises.

It is needless to say that even the modifications are not limited to those described below. A limited interpretation of the present invention based on the descriptions of the embodiment set forth above and the modifications set forth below will be unreasonably prejudicial to the interest of the applicant (who is, in particular, necessitated to file the application in hast under the principle of first-to-file), and, meanwhile, unreasonably beneficial to a person to copy the present invention. Thus, the limitative interpretation must not be given.

Further, it is, as a matter of course, to be under stood that the constituent features and/or components of the above-described embodiment and those described for each of the below-described modifications may be implemented alone, or in combination with all or a part of the constituent features and/or components as long as no technical contradiction arises.

The present invention is not limited only to the filler particle including a simple oxide film (which is a film obtained by treating aluminum nitride with heat in the oxidizing atmosphere such as an ambient air atmosphere). Specifically, the present invention may be favorably applied to filler particles with films of a phosphoric acid type or a $SiO_2$ type, for example.

More specifically, for the filler particles having the phosphoric acid films (refer to, for example, JP H02-141409 A, JP H07-33415 A, JP H09-202608 A, JP 2002-226207 A), formation of the films on surface layers of the particles is performed, for example, by immersing aluminum nitride particles in a solution (an aqueous solution or an alcoholic solution) of organic phosphoric acid or inorganic phosphoric acid, and performing a drying process or a heat treatment process as required after the immersing. Similarly, for the filler particles having the $SiO_2$ films (refer to, for example, JP 2004-83334 A), formation of the films on surface layers of the particles is performed, for example, by immersing aluminum nitride particles in a solution of a silicate treating agent or treating the aluminum nitride particles with $SiO_2$ vapor.

Also in the film forming processes as described above, film formation is preferentially promoted in the corner portion, while the film is formed at an inferior progress level in the planer portion between corners, which might cause the wettability to the glass matrix to remain low. Meanwhile, in the process of using the solution, it is considered that the film thickness is, as opposed to the above-described process, reduced in the corner portion depending on the solution to be used. Thus, whenever commonly conceivable film forming processes are employed, there is variability in the formation state of the film resulting from the shape of the aluminum nitride particle.

In this aspect, when the aluminum nitride particle having the substantially spherical shape with the cornerless smooth surface is used according to the present invention, the substantially uniform formation state (thickness) of the film can be obtained even in the above-described film formation processes, to thereby stably achieve the good thermal conductivity.

Working examples 11 to 18 and comparative examples 11 to 18 indicated below represent evaluation results of the filler particles with the phosphoric acid films. Specifically, the working examples 11a to 11c and the comparative examples 11a to 11c are obtained by mixing a glass raw material (a raw material powder of borosilicate glass consisting mainly of a borosilicate component and additionally including an alkaline component, an alkaline earth component, and an aluminous component) and filler particles at a volume ratio of 55:45, degreasing the resultant mixture at 600° C. in an ambient air atmosphere, and after degreasing, firing the mixture at 900 to 1050° C. in a nitrogen atmosphere. In addition, the filler particles are formed by coating particles of aluminum nitride raw material with the phosphoric acid films in the process described below. It should be noted that the working examples 11a to 11c (as well as the comparative examples 11a to 11c) are respectively obtained from different batches in an aluminum nitride film forming step and in the glass mixing step.

Firstly, a powder of aluminum nitride raw material particles, which satisfy the condition of predetermined particle diameter and have the predetermined sphere percentage listed in the below-described tables, is dispersed in a mixed solution of alcohol and water, and inorganic phosphoric acid is subsequently dissolved in the powder dispersed solution. Then, a film forming reaction is developed on the surfaces of the raw material particles by heating the dispersed solution while stirring enough. Next, from the dispersed solution obtained after the reaction, particles are extracted by filtering. After washing with alcohol, the particles are dried. In this way, an oxide layer (an oxide film) is formed on a surface layer (the surface) of the filler particle with an oxygen content of 1.0 to 18 percent by weight.

The working examples 11 to 18 and the comparative examples 11 to 18 show evaluation results conducted to evaluate how the thermal conductivity is affected by the sphere percentage under various conditions of the volume percentage of the filler particles, the average particle diameter of the glass raw material, and the average particle diameter of the filler particles. The evaluation results are indicated in Tables 11 to 18. As is evident from the evaluation results listed below, also in the filler particles with the phosphoric acid films, the thermal conductivity is increased in the working examples wherein the sphere percentage is higher than or equal to 70% under any of the various conditions of the volume percentage of the filler particles, the average particle diameter of the glass raw material, and the average particle diameter of the filler particles, as compared to the comparative examples wherein the sphere percentage is lower than 70%. Moreover, referring to Table 11, the variability in the thermal conductivity from batch to batch in the working examples wherein the sphere percentage is higher than or equal to 70% is smaller than those in the comparative examples wherein the sphere percentage is lower than 70%.

TABLE 11

| | Glass | | Filler | | | Thermal |
| --- | --- | --- | --- | --- | --- | --- |
| | vol % | Particle diameter | vol % | Particle diameter | Sphere percentage | conductivity [W/m·K] |
| Working example 11a | 55 | 4 | 45 | 5 | 70 | 15 |
| Working example 11b | 55 | 4 | 45 | 5 | 70 | 16 |
| Working example 11c | 55 | 4 | 45 | 5 | 70 | 15 |
| Comparative example 11a | 55 | 4 | 45 | 5 | 60 | 9 |
| Comparative example 11b | 55 | 4 | 45 | 5 | 60 | 6 |
| Comparative example 11c | 55 | 4 | 45 | 5 | 60 | 7 |

TABLE 12

| | Glass | | Filler | | | Thermal |
| --- | --- | --- | --- | --- | --- | --- |
| | vol % | Particle diameter | vol % | Particle diameter | Sphere percentage | conductivity [W/m·K] |
| Working example 12 | 55 | 4 | 45 | 2 | 70 | 13 |
| Comparative example 12 | 55 | 4 | 45 | 2 | 60 | 6 |

TABLE 13

| | Glass | | Filler | | | Thermal |
| --- | --- | --- | --- | --- | --- | --- |
| | vol % | Particle diameter | vol % | Particle diameter | Sphere percentage | conductivity [W/m·K] |
| Working example 13 | 50 | 4 | 50 | 2 | 70 | 17 |
| Comparative example 13 | 50 | 4 | 50 | 2 | 60 | 10 |

TABLE 14

| | Glass | | Filler | | | Thermal |
| --- | --- | --- | --- | --- | --- | --- |
| | vol % | Particle diameter | vol % | Particle diameter | Sphere percentage | conductivity [W/m·K] |
| Working example 14 | 50 | 4 | 50 | 5 | 70 | 19 |
| Comparative example 14a | 50 | 4 | 50 | 5 | 60 | 10 |
| Comparative example 14b | 50 | 4 | 50 | 5 | 50 | 8 |

TABLE 15

| | Glass | | Filler | | | Thermal |
| --- | --- | --- | --- | --- | --- | --- |
| | vol % | Particle diameter | vol % | Particle diameter | Sphere percentage | conductivity [W/m·K] |
| Working example 15 | 45 | 4 | 55 | 5 | 70 | 24 |
| Comparative example 15 | 45 | 4 | 55 | 5 | 60 | 11 |

TABLE 16

| | Glass | | Filler | | | Thermal |
| --- | --- | --- | --- | --- | --- | --- |
| | vol % | Particle diameter | vol % | Particle diameter | Sphere percentage | conductivity [W/m·K] |
| Working example 16 | 40 | 4 | 60 | 10 | 80 | 25 |
| Comparative example 16 | 40 | 4 | 60 | 10 | 60 | 12 |

TABLE 17

| | Glass | | Filler | | | Thermal |
| --- | --- | --- | --- | --- | --- | --- |
| | vol % | Particle diameter | vol % | Particle diameter | Sphere percentage | conductivity [W/m·K] |
| Working example 17 | 60 | 4 | 40 | 5 | 70 | 10 |
| Comparative example 17 | 60 | 4 | 40 | 5 | 60 | 6 |

TABLE 18

| | Glass | | Filler | | | Thermal |
| --- | --- | --- | --- | --- | --- | --- |
| | vol % | Particle diameter | vol % | Particle diameter | Sphere percentage | conductivity [W/m · K] |
| Working example 18 | 70 | 4 | 30 | 5 | 70 | 8 |
| Comparative example 18 | 70 | 4 | 30 | 5 | 60 | 4 |

Other modifications, which are not particularly described, are also contained in the technical scope of the present invention, of course, as long as the essential part of the present invention is not changed.

Further, the operationally/functionally-represented features and components in each constituent element of the means to solve the problems according to the present invention may include any structure capable of implementing the represented operation and/or function in addition to the specific structure disclosed in the above-described embodiment and the modifications. Moreover, the prior applications and the patent publications (including their specifications and drawings) noted in this specification may be appropriately incorporated herein by reference in their entirety.

What is claimed is:

1. A glass-ceramic composite material comprising:
a glass matrix, and
filler particles, each of which is formed by an aluminum nitride particle having a surface layer on which an oxide film is formed, and arranged in the glass matrix, wherein
the filler article has a cornerless smooth surface, and
a percentage of the number of filler particles having a sphericity of 0.8 or greater, which is a value of a minor diameter divided by a major diameter, is higher than or equal to 70% on the condition where any fine particle of which particle diameter is smaller than 0.5 μm is excluded from the number of the filler particles.

2. The glass-ceramic composite material according to claim 1, wherein an average particle diameter of the filler particles is 2 to 40 μm.

3. The glass ceramic composite material according to claim 1, wherein the aluminum nitride particle is an unsintered object.

4. The glass ceramic composite material according to claim 2, wherein the aluminum nitride particle is an unsintered object.

* * * * *